(12) United States Patent
Matsumoto

(10) Patent No.: US 12,476,545 B2
(45) Date of Patent: Nov. 18, 2025

(54) MEMORY SYSTEM AND POWER CONTROL CIRCUIT

(71) Applicant: Kioxia Corporation, Tokyo (JP)

(72) Inventor: Hajime Matsumoto, Higashimurayama (JP)

(73) Assignee: Kioxia Corporation, Tokyo (JP)

( * ) Notice: Subject to any disclaimer, the term of this patent is extended or adjusted under 35 U.S.C. 154(b) by 196 days.

(21) Appl. No.: 18/358,387

(22) Filed: Jul. 25, 2023

(65) Prior Publication Data

US 2024/0097570 A1    Mar. 21, 2024

(30) Foreign Application Priority Data

Sep. 15, 2022 (JP) ................. 2022-147204

(51) Int. Cl.
*H02M 3/20* (2006.01)
*G06F 13/42* (2006.01)
*H02M 3/157* (2006.01)

(52) U.S. Cl.
CPC .......... *H02M 3/20* (2013.01); *G06F 13/4221* (2013.01); *H02M 3/157* (2013.01)

(58) Field of Classification Search
CPC ...... H02M 3/20; H02M 3/157; G06F 13/4221
USPC ........................................................ 363/15
See application file for complete search history.

(56) References Cited

U.S. PATENT DOCUMENTS

| | | | |
|---|---|---|---|
| 8,787,039 B2 * | 7/2014 | Shi ...................... | H02M 1/4258 363/16 |
| 8,953,341 B2 | 2/2015 | Fahlenkamp | |
| 9,030,182 B2 | 5/2015 | Galloway | |
| 9,748,838 B2 * | 8/2017 | Chew ...................... | H02M 3/04 |
| 2013/0336067 A1 * | 12/2013 | Tanaka .................. | G06F 1/3225 365/185.18 |
| 2015/0089261 A1 | 3/2015 | Segawa et al. | |
| 2018/0004267 A1 * | 1/2018 | Kimura ................. | G06F 3/0635 |
| 2021/0074336 A1 * | 3/2021 | Kumagai ........... | G11C 14/0018 |
| 2021/0091671 A1 | 3/2021 | Fukushima et al. | |
| 2022/0197520 A1 * | 6/2022 | Kobayashi ............ | H02M 1/007 |

FOREIGN PATENT DOCUMENTS

| | | |
|---|---|---|
| JP | 2021-44037 A | 3/2021 |
| TW | 201518931 A | 5/2015 |
| TW | 201941190 A | 10/2019 |
| TW | 202225986 A | 7/2022 |

* cited by examiner

*Primary Examiner* — Yemane Mehari
(74) *Attorney, Agent, or Firm* — Oblon, McClelland, Maier & Neustadt, L.L.P.

(57) ABSTRACT

According to one embodiment, a memory system connectable to a host includes a nonvolatile memory, a controller, and a power control circuit. The controller controls the nonvolatile memory. The power control circuit controls power to be supplied to the controller and the nonvolatile memory and includes one or more DC/DC converters. The nonvolatile memory and the controller include one or more circuit blocks. Each of the one or more DC/DC converters supplies an internal power supply voltage to one of the one or more circuit blocks. A first DC/DC converter of the one or more DC/DC converters transitions to a forced pulse width modulation mode in response to the memory system that has transitioned from a low power consumption mode to a normal operation mode.

20 Claims, 8 Drawing Sheets

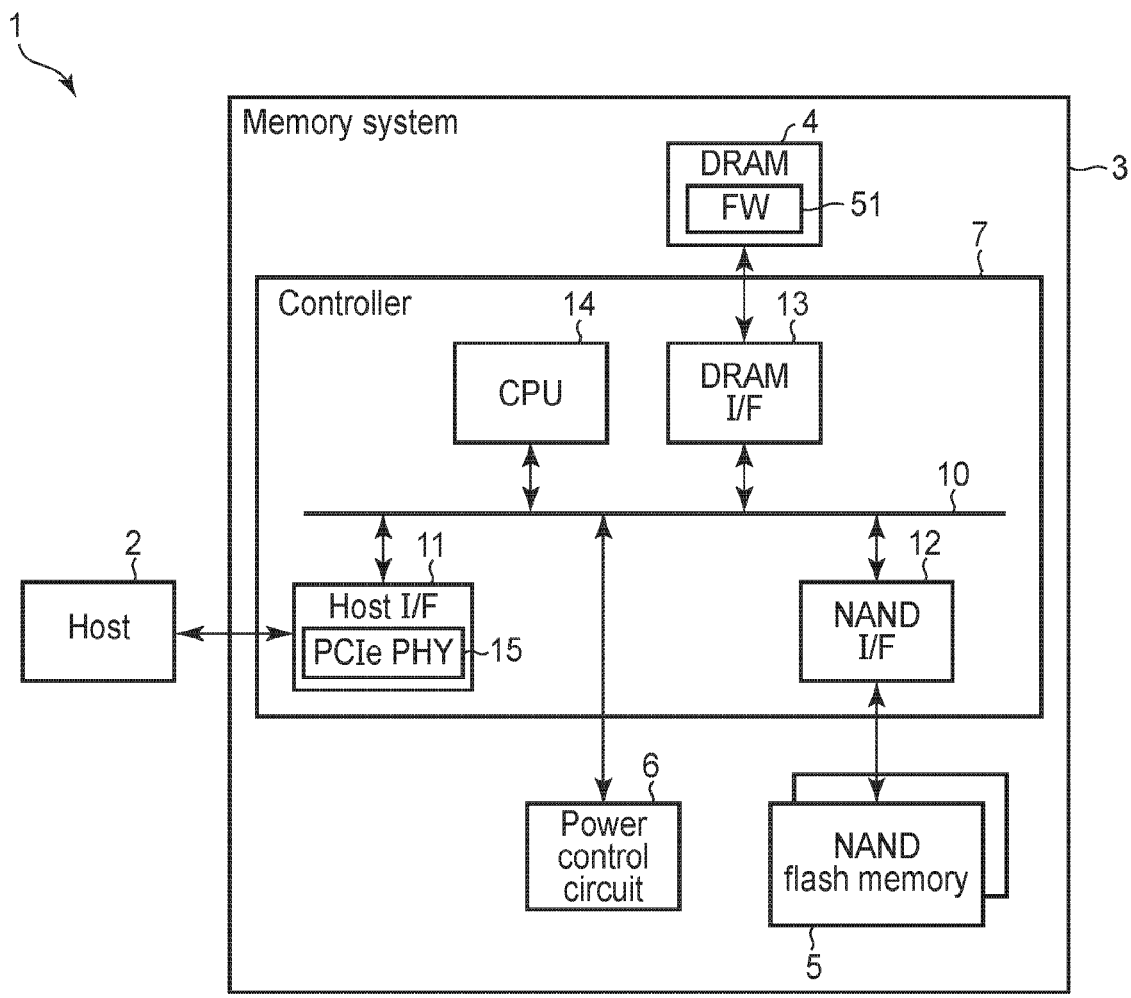
F I G. 1

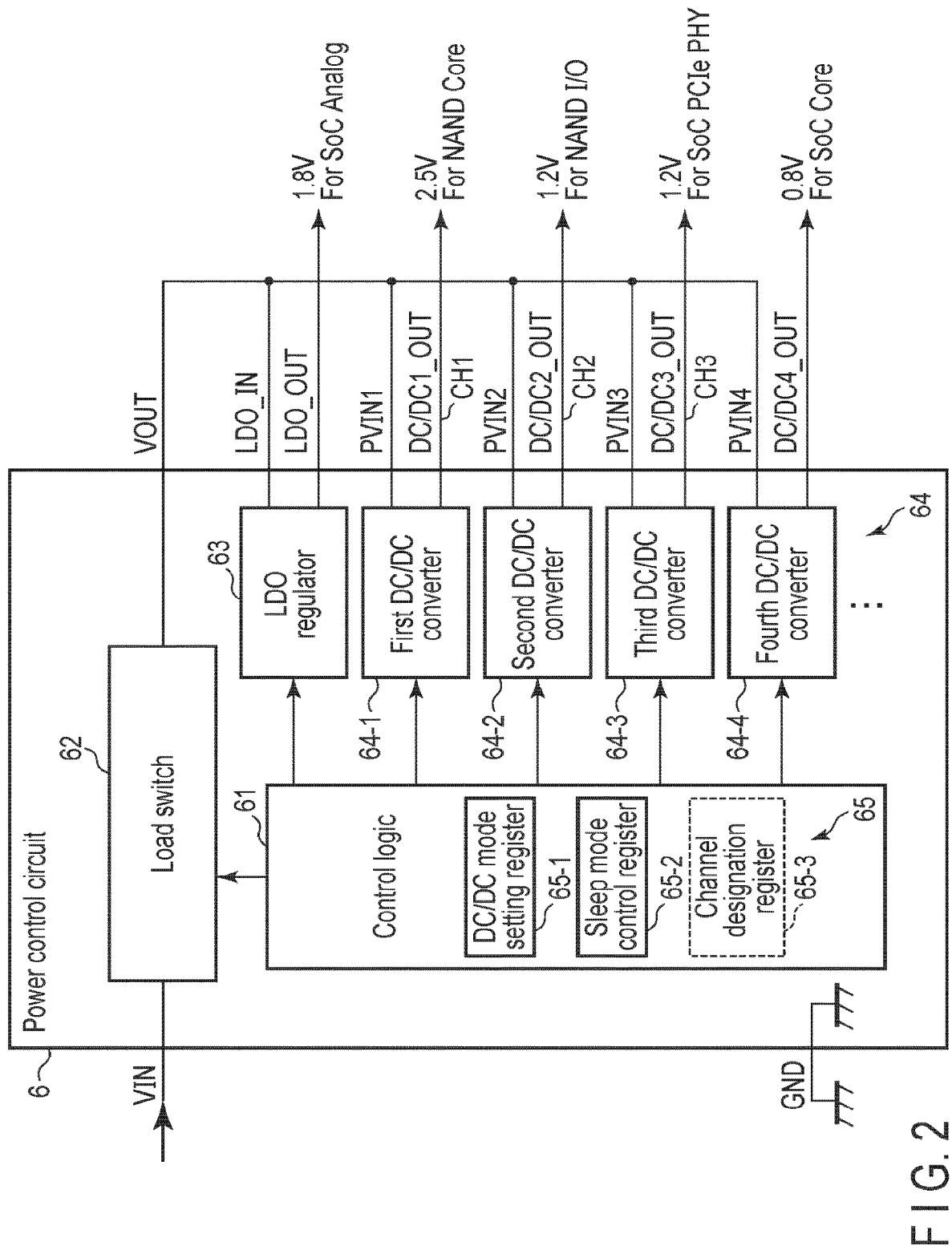
F I G. 2

| Bit | [7] | [6] | [5] | [4~0] |
|---|---|---|---|---|
| Description | CH1_PWM | CH2_PWM | CH3_PWM | Reserved |
| Value | 0:Auto mode<br>1:Forced PWM mode | 0:Auto mode<br>1:Forced PWM mode | 0:Auto mode<br>1:Forced PWM mode | |

F I G. 3

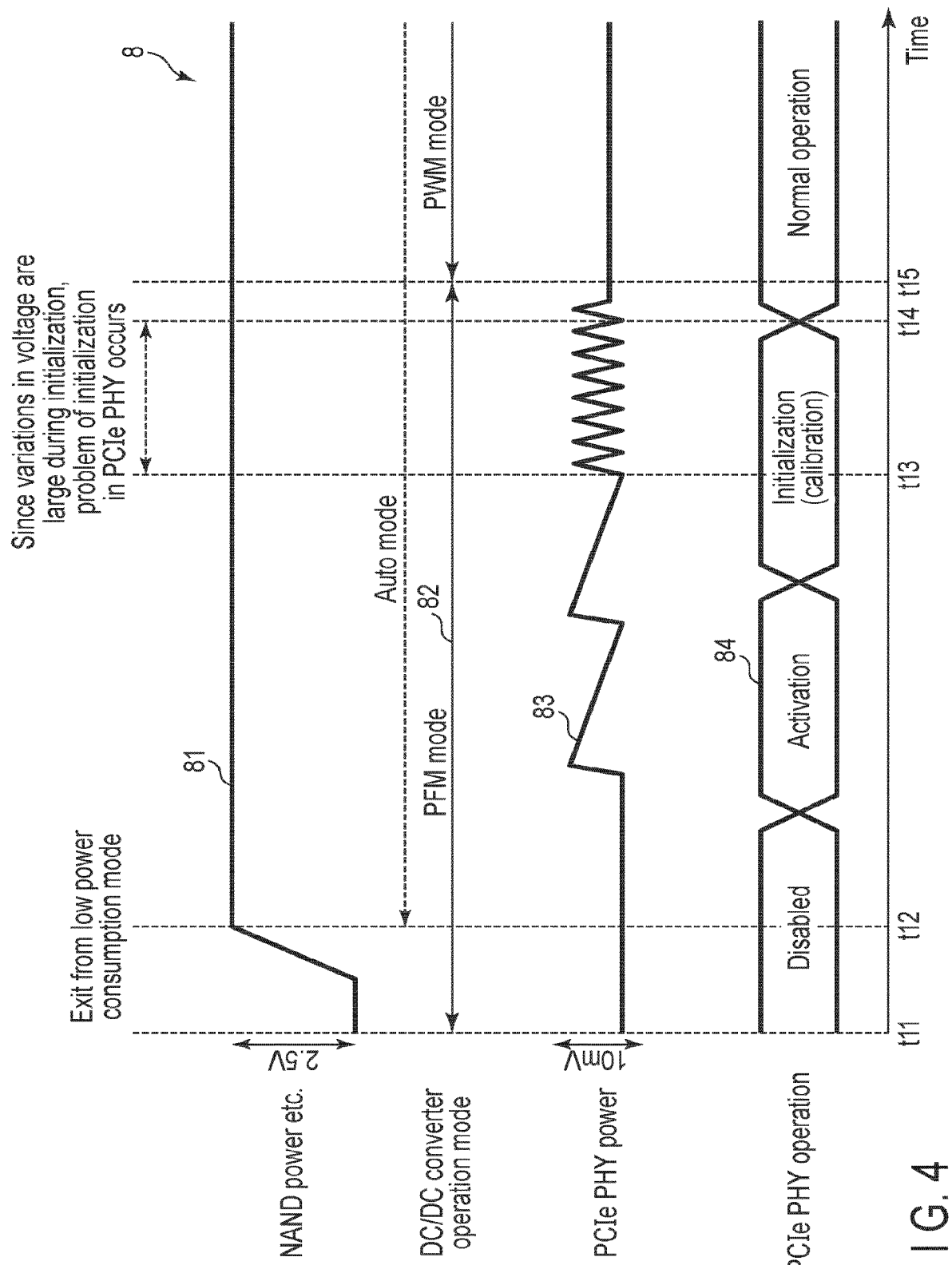
F I G. 4

| Bit | [7] | [6] | [5] | [4] | [3~1] | [0] |
|---|---|---|---|---|---|---|
| Description | CH1_Sleep | CH2_Sleep | CH3_Sleep | LDO_Sleep | Reserved | Sleep |
| Value | 0:When sleep, CH1 turn off 1:When sleep, CH1 alive and enter LPM | 0:When sleep, CH2 turn off 1:When sleep, CH2 alive and enter LPM | 0:When sleep, CH3 turn off 1:When sleep, CH3 alive and enter LPM | 0:When sleep, LDO turn off 1:When sleep, LDO alive and enter LPM | | 0:Exit sleep mode 1:Enter sleep mode |

F I G. 5

| Bit | [7] | [6] | [5] | [4] | [3~1] | [0] |
|---|---|---|---|---|---|---|
| Description | CH1_Sleep | CH2_Sleep | CH3_Sleep | LDO_Sleep | Reserved | Sleep |
| Value | 0:When sleep, CH1 turn off  1:When sleep, CH1 alive and enter LPM | 0:When sleep, CH2 turn off  1:When sleep, CH2 alive and enter LPM | 0:When sleep, CH3 turn off  1:When sleep, CH3 alive and enter LPM | 0:When sleep, LDO turn off  1:When sleep, LDO alive and enter LPM | | 0:Exit sleep mode, and set every DC/DC channel in forced PWM mode  1:Enter sleep mode |

F I G. 6

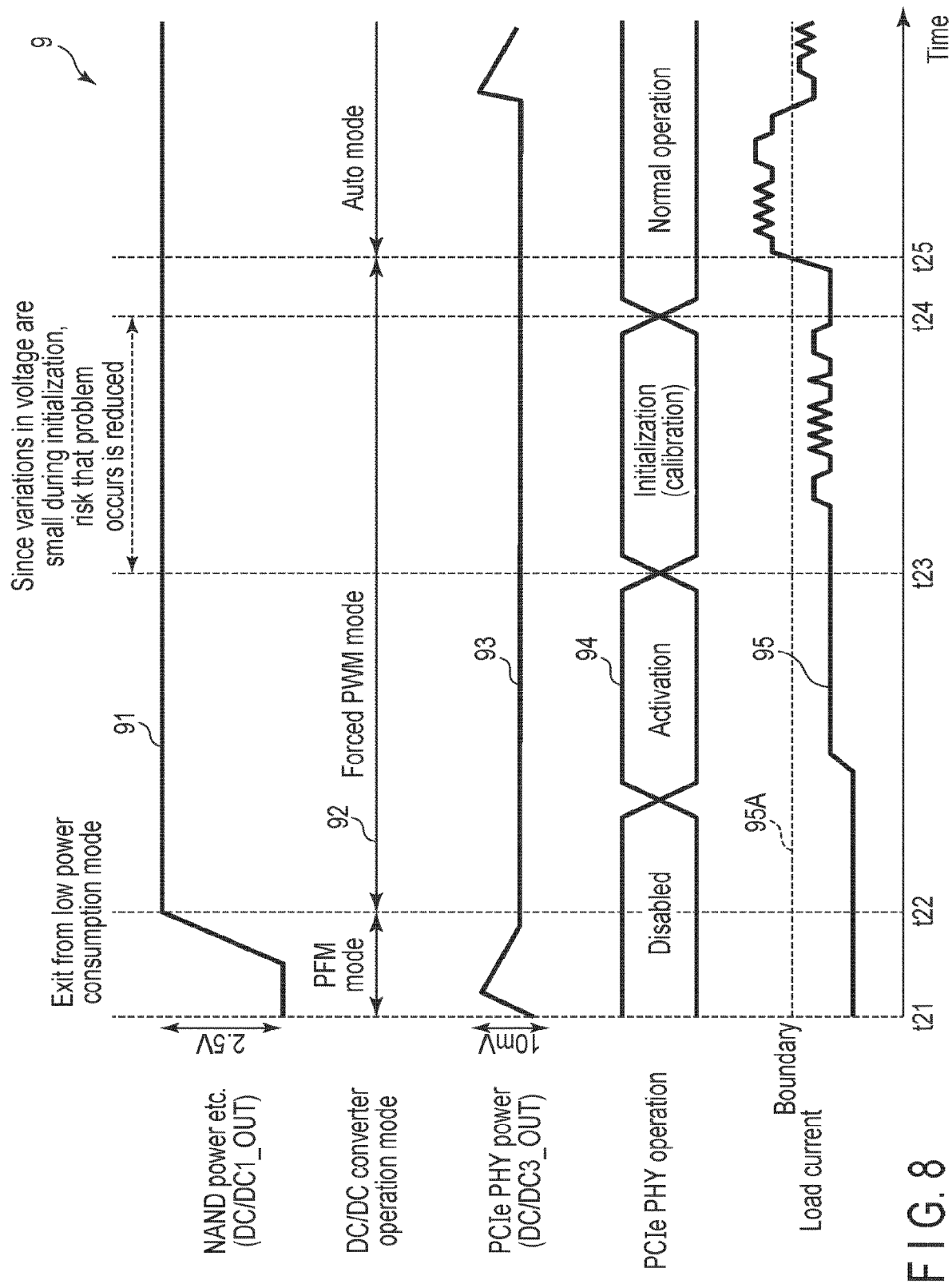
F I G. 8

MEMORY SYSTEM AND POWER CONTROL CIRCUIT

CROSS-REFERENCE TO RELATED APPLICATIONS

This application is based upon and claims the benefit of priority from Japanese Patent Application No. 2022-147204, filed Sep. 15, 2022, the entire contents of which are incorporated herein by reference.

FIELD

Embodiments described herein relate generally to a memory system including a nonvolatile memory, and a power control circuit of the memory system.

BACKGROUND

In recent years, memory systems that include a nonvolatile memory are widely used. As one of such memory systems, a solid state drive (SSD) that includes a NAND flash memory is known. The SSD is used as a main storage for various computing devices.

A memory system includes a power control circuit. The power control circuit is a circuit that controls power to be supplied to each unit of the memory system.

The memory system may be set in a low power consumption mode. The low power consumption mode is a mode in which power consumption is lower than that in a normal operation mode.

When the memory system has exit from the low power mode to the normal operation mode, initialization of at least part of the memory system is performed. Power supplied from the power control circuit to each unit of the memory system immediately after the exit may have large variations in voltage. Such variations in supply voltage may cause a failure of the initialization in the memory system.

BRIEF DESCRIPTION OF THE DRAWINGS

FIG. 1 is a block diagram illustrating an example of a configuration of an information processing system that includes a memory system according to an embodiment.

FIG. 2 is a circuit diagram illustrating an example of a configuration of a power control circuit of the memory system according to the embodiment.

FIG. 3 is a diagram illustrating an example of a configuration of a DC/DC mode setting register that is used in the memory system according to the embodiment.

FIG. 4 is a time chart illustrating transitions of operations and voltages in a case where a memory system according to a comparative example exits from a low power consumption mode to a normal operation mode.

FIG. 5 is a diagram illustrating an example of a configuration of a sleep mode control register that is used in the memory system according to the comparative example.

FIG. 6 is a diagram illustrating an example of a configuration of a sleep mode control register that is used in the memory system according to the embodiment.

FIG. 8 is a time chart illustrating an example of transitions of operations, voltages, and a current in the case where the memory system according to the embodiment exits from the low power consumption mode to the normal operation mode.

DETAILED DESCRIPTION

Figure 7:
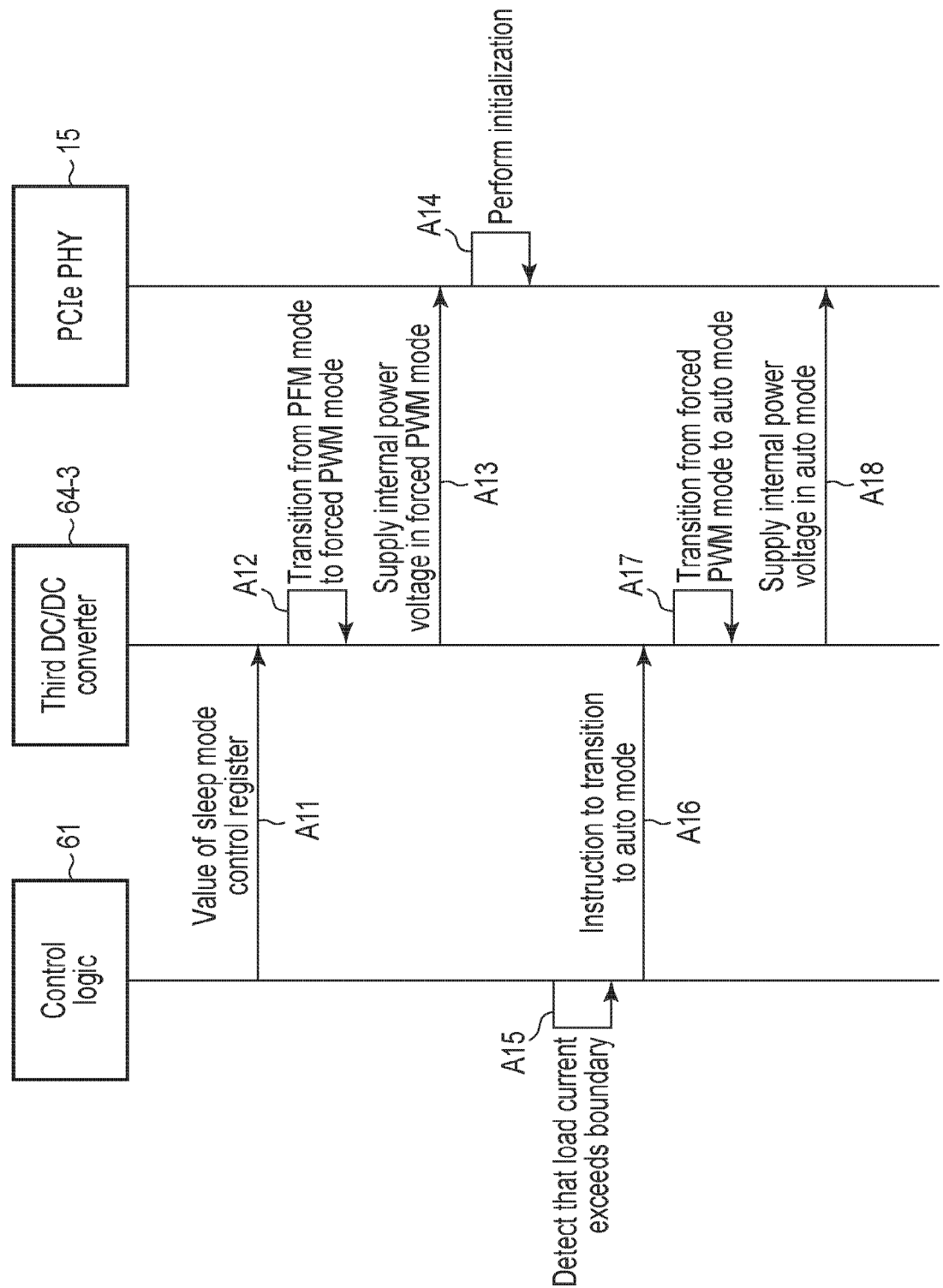
FIG. 7 is a sequence diagram illustrating an example of an operation in a case where the memory system according to the embodiment exits from a low power consumption mode to a normal operation mode.

In general, according to one embodiment, a memory system connectable to a host includes a nonvolatile memory, a controller, and a power control circuit. The controller controls the nonvolatile memory. The power control circuit controls power to be supplied to the controller and the nonvolatile memory and includes one or more DC/DC converters. The nonvolatile memory and the controller include one or more circuit blocks. Each of the one or more DC/DC converters supplies an internal power supply voltage to one of the one or more circuit blocks. A first DC/DC converter of the one or more DC/DC converters transitions to a forced pulse width modulation mode in response to the memory system that has transitioned from a low power consumption mode to a normal operation mode.

Various embodiments will be described hereinafter with reference to the accompanying drawings.

First, an example of a configuration of an information processing system 1 that includes a memory system according to an embodiment will be described with reference to FIG. 1. The information processing system 1 includes a host device 2 and a memory system 3.

The host device 2 is capable of storing data in the memory system 3 and reading data from the memory system 3, and it is, for example, a storage server and a personal computer. Hereinafter, the host device 2 will also be referred to as a host 2.

The memory system 3 is, for example, a storage device configured to write data to a nonvolatile memory, such as a NAND flash memory 5, and read data from the nonvolatile memory. Note that the nonvolatile memory is not limited to the NAND flash memory 5. The memory system 3 is also referred to as a storage device. The memory system 3 is realized as, for example, a solid state drive (SSD).

The memory system 3 may be used as a storage of the host 2. The memory system 3 is connected to the host 2 via a cable, for example.

An interface for connecting the host 2 and the memory system 3 conforms to standards such as PCI Express™ (PCIe™) or NVM Express™ (NVMe™).

The memory system 3 operates, for example, in either a normal operation mode or a low power consumption mode. The low power consumption mode is an operation mode in which power consumption is lower than that in the normal operation mode. The low power consumption mode may include an off mode in which power supply to at least part of units of the memory system 3 is stopped, and a low power mode (LPM) in which the operation and performance are restricted to lower power consumption than that in the normal operation mode. The low power mode includes, for example, a mode called a sleep mode. In a case where the memory system 3 has multiple low power consumption modes such as the off mode and the sleep mode, a decrease in power consumption of the memory system 3 can be controlled more effectively. Note that the low power consumption modes may include two or more modes. Thus, multiple power states that are different in power consumption may be provided as the low power consumption modes of the memory system 3 of the present embodiment.

The memory system 3 includes, for example, a dynamic random access memory (DRAM) 4, a NAND flash memory 5, a power control circuit 6, and a controller 7.

The DRAM 4 is a volatile RAM and includes, for example, a storage area of firmware (FW) 51.

The FW 51 is a program for controlling the operation of the controller 7. The FW 51 is loaded from the NAND flash memory 5 to the DRAM 4 when the memory system 3 is boot up, for example.

The NAND flash memory 5 includes multiple blocks (not illustrated). Each of the blocks includes multiple pages. The blocks each function as the minimum unit of a data erase operation. The block may also be referred to as an erasure block or a physical block. Each of the pages includes memory cells connected to a single word line. The pages each function as a unit of a data write operation and a data read operation. Note that the word line may function as a unit of a data write operation and a data read operation.

The power control circuit 6 controls power to be supplied to each unit (for example, the DRAM 4, the NAND flash memory 5, and the controller 7) of the memory system 3. The power control circuit 6 is implemented as a power management IC (PMIC), for example. The power control circuit 6 transitions to a sleep mode in response to the memory system 3 that has transitioned from the normal operation mode to the low power consumption mode. The power control circuit 6 exits from the sleep mode in response to the memory system 3 that has transitioned from the low power consumption mode to the normal operation mode. The sleep mode is a mode in which at least part of circuit blocks in the power control circuit 6 are turned off to reduce power consumption.

The power control circuit 6 is capable of communicating with the controller 7. Communications between the power control circuit 6 and the controller 7 conforms to a serial communication standard such as Inter-Integrated Circuit (I2C) (not illustrated). The power control circuit 6 receives, for example, a command from the controller 7 via the communications. This command is, for example, a command for controlling the operation of the power control circuit 6. The specific configuration of the power control circuit 6 will be described later with reference to FIG. 2.

The controller 7 is a controller configured to control the DRAM 4, the NAND flash memory 5, and the power control circuit 6. The controller 7 is implemented by a circuit such as a system-on-a-chip (SoC). The controller 7 may include a static random access memory (SRAM) or a DRAM. In this case, the DRAM 4 outside the controller 7 need not be provided.

The controller 7 includes, for example, a host interface (host I/F) 11, a NAND interface (NAND I/F) 12, a DRAM interface (DRAM I/F) 13, and a CPU 14. The host I/F 11, the NAND I/F 12, the DRAM I/F 13, and the CPU 14 are connected via a bus 10, for example.

The host I/F 11 functions as a circuit that receives various commands, for example, I/O commands and various control commands, and data from the host 2. The host I/F 11 also functions as a circuit that transmits a response to a command and data to the host 2. The host I/F 11 includes a PCIe PHY 15.

The PCIe PHY 15 is a circuit that is connected to the host 2 via a serial interface. The serial interface includes a link capable of interconnecting the host 2 and the memory system 3. The PCIe PHY 15 corresponds to a physical layer defined by the PCIe standard. The PCIe PHY 15 has, for example, a physical connection form that conforms to the PCIe standard. The PCIe PHY 15 performs an interface operation for physically transmitting and receiving data via the link.

The NAND I/F 12 electrically connects the controller 7 and the NAND flash memory 5. The NAND I/F 12 conforms to an interface standard such as Toggle DDR or Open NAND Flash Interface (ONFI).

The NAND I/F 12 functions as a NAND control circuit configured to control access to the NAND flash memory 5. The NAND I/F 12 may be connected to the respective memory chips in the NAND flash memory 5 via multiple channels (Ch). By operating the memory chips in parallel, it is possible to broaden an access bandwidth between the controller 7 and the NAND flash memory 5.

The DRAM I/F 13 functions as a DRAM control circuit configured to control access to the DRAM 4.

The CPU 14 is a processor configured to control the host I/F 11, the NAND I/F 12, and the DRAM I/F 13. The CPU 14 performs various processes by executing the FW 51 loaded from the NAND flash memory 5 onto the DRAM 4. The FW 51 is a control program including instructions for causing the CPU 14 to execute the various processes. The CPU 14 may perform command processes to execute various commands from the host 2. The operation of the CPU 14 is controlled by the FW 51 executed by the CPU 14.

The function of each unit in the controller 7 may be realized by dedicated hardware in the controller 7 or may be realized by the CPU 14 executing the FW 51.

Next, the configuration of the power control circuit 6 will be described. FIG. 2 is a circuit diagram illustrating an example of the configuration of the power control circuit 6.

The power control circuit 6 includes, for example, control logic 61, a load switch 62, a low dropout (LDO) regulator 63, and one or more DC/DC converters 64 (64-1, 64-2, 64-3, 64-4, . . . ).

The control logic 61 is a circuit that controls each unit in the power control circuit 6. The control logic 61 sends, for example, a control signal to control the operation of each unit in the power control circuit 6. Also, the control logic 61 may monitor a value related to a current that is passed through each of one or more circuit blocks to which power is supplied from the power control circuit 6. The value related to a current to be monitored may be a value of the current itself or may be an index or a signal that represents the value of the current. Each of the circuit blocks is included, for example, in either the controller 7 or the NAND flash memory 5. More specifically, each of the circuit blocks is, for example, a core part of the SoC that is the controller 7, a core part of the NAND flash memory 5, an input/output (I/O) part of the NAND flash memory 5, or the PCIe PHY 15. From the point of view of the power control circuit 6, each circuit block to which power is supplied is also called a load. The current that is passed through the load is also called a load current.

The load switch 62 is a switch circuit that switches between the supply (on) and stop (off) of power to each unit in the power control circuit 6. The load switch 62 is supplied with a power supply voltage VIN from an external power supply. The load switch 62 switches between the on and off of power supply in response to a control signal from the control logic 61. The load switch 62 outputs a power supply voltage VOUT while it is turned on.

The power supply voltage VOUT is output to the outside of the power control circuit 6 through a pin of the power control circuit 6. The power supply voltage VOUT is taken in the power control circuit 6 through another pin of the power control circuit 6. More specifically, the power supply voltage VOUT is input as an input power supply voltage LDO_IN of the LDO regulator 63. The power supply voltage VOUT is also input as an input power supply voltage PVIN of each of the one or more DC/DC converters 64.

The LDO regulator 63 is a linear regulator that is capable of operating with a small input/output potential difference. The LDO regulator 63 adjusts the input power supply voltage LDO_IN by voltage control and outputs an internal power supply voltage LDO_OUT. Instead of the output voltage VOUT of the load switch 62, another voltage may be used for the input power supply voltage LDO_IN. The LDO regulator 63 operates (turns on) or stops (turns off) in response to a control signal from the control logic 61. While the LDO regulator 63 turns on, it outputs the internal power supply voltage LDO_OUT.

The internal power supply voltage LDO_OUT is output to the outside of the power control circuit 6 through a pin of the power control circuit 6. The internal power supply voltage LDO_OUT is, for example, 1.8 volts (V). The internal power supply voltage LDO_OUT is used, for example, for an analog power supply to the SoC that is the controller 7.

Each of the one or more DC/DC converters 64 is a converter that converts a voltage in direct current. Each of the one or more DC/DC converters 64 generates an internal power supply voltage to be supplied to a circuit block that is included in either the controller 7 or the NAND flash memory 5. The number of the DC/DC converters 64 provided in the power control circuit 6 is based on the number of components (for example, circuit blocks) in the memory system 3 to be supplied with power from the power control circuit 6. Note that in the following descriptions, any unspecified one of the one or more DC/DC converters 64 may be referred to simply as a DC/DC converter 64. Here, a case where the one or more DC/DC converters 64 include four DC/DC converters 64-1, 64-2, 64-3, and 64-4 will be explained as illustrated in the figure.

The first DC/DC converter 64-1 is supplied with the power supply voltage VOUT from the load switch 62 as an input power supply voltage PVIN1. The first DC/DC converter 64-1 adjusts the input power supply voltage PVIN1 by voltage control and outputs an internal power supply voltage DC/DC1_OUT. Instead of the output voltage VOUT of the load switch 62, another voltage may be used for the input power supply voltage PVIN1. The first DC/DC converter 64-1 operates (turns on) or stops (turns off) in response to a control signal from the control logic 61. While the first DC/DC converter 64-1 turns on, it outputs the internal power supply voltage DC/DC1_OUT.

The internal power supply voltage DC/DC1_OUT is output to the outside of the power control circuit 6 through a pin of the power control circuit 6. The internal power supply voltage DC/DC1_OUT is, for example, 2.5 V. The internal power supply voltage DC/DC1_OUT is used, for example, for a power supply for the core part of the NAND flash memory 5. That is, the internal power supply voltage DC/DC1_OUT is supplied to a circuit block of the core part of the NAND flash memory 5. A power supply channel from the first DC/DC converter 64-1 to the core part of the NAND flash memory 5 with the internal power supply voltage DC/DC1_OUT is referred to as a DC/DC channel CH1. A DC/DC channel that is a power supply channel is assigned information (for example, number) by which the corresponding DC/DC converter 64 is identifiable.

The second DC/DC converter 64-2 is supplied with the power supply voltage VOUT from the load switch 62 as an input power supply voltage PVIN2. The second DC/DC converter 64-2 adjusts the input power supply voltage PVIN2 by voltage control and outputs an internal power supply voltage DC/DC2_OUT. Instead of the output voltage VOUT of the load switch 62, another voltage may be used for the input power supply voltage PVIN2. The second DC/DC converter 64-2 operates (turns on) or stops (turns off) in response to a control signal from the control logic 61. While the second DC/DC converter 64-2 turns on, it outputs the internal power supply voltage DC/DC2_OUT.

The internal power supply voltage DC/DC2_OUT is output to the outside of the power control circuit 6 through a pin of the power control circuit 6. The internal power supply voltage DC/DC2_OUT is, for example, 1.2 V. The internal power supply voltage DC/DC2_OUT is used, for example, for a power supply for the I/O part of the NAND flash memory 5. That is, the internal power supply voltage DC/DC2_OUT is supplied to a circuit block of the I/O part of the NAND flash memory 5. A power supply channel from the second DC/DC converter 64-2 to the I/O part of the NAND flash memory 5 with the internal power supply voltage DC/DC2_OUT is referred to as a DC/DC channel CH2.

The third DC/DC converter 64-3 is supplied with the power supply voltage VOUT from the load switch 62 as an input power supply voltage PVIN3. The third DC/DC converter 64-3 adjusts the input power supply voltage PVIN3 by voltage control and outputs an internal power supply voltage DC/DC3_OUT. Instead of the output voltage VOUT of the load switch 62, another voltage may be used for the input power supply voltage PVIN3. The third DC/DC converter 64-3 operates (turns on) or stops (turns off) in response to a control signal from the control logic 61. While the third DC/DC converter 64-3 turns on, it outputs the internal power supply voltage DC/DC3_OUT.

The internal power supply voltage DC/DC3_OUT is output to the outside of the power control circuit 6 through a pin of the power control circuit 6. The internal power supply voltage DC/DC3_OUT is, for example, 1.2 V. The internal power supply voltage DC/DC3_OUT is used, for example, for a power supply for the PCIe PHY 15 included in the SoC that is the controller 7. That is, the internal power supply voltage DC/DC3_OUT is supplied to a circuit block of the PCIe PHY 15. A power supply channel from the third DC/DC converter 64-3 to the PCIe PHY 15 with the internal power supply voltage DC/DC3_OUT is referred to as a DC/DC channel CH3.

The fourth DC/DC converter 64-4 is supplied with the power supply voltage VOUT from the load switch 62 as an input power supply voltage PVIN4. The fourth DC/DC converter 64-4 adjusts the input power supply voltage PVIN4 by voltage control and outputs an internal power supply voltage DC/DC4_OUT. Instead of the output voltage VOUT of the load switch 62, another voltage may be used for the input power supply voltage PVIN4. The fourth DC/DC converter 64-4 operates (turns on) or stops (turns off) in response to a control signal from the control logic 61. While the fourth DC/DC converter 64-4 turns on, it outputs the internal power supply voltage DC/DC4_OUT.

The internal power supply voltage DC/DC4_OUT is output to the outside of the power control circuit 6 through a pin of the power control circuit 6. The internal power supply voltage DC/DC4_OUT is, for example, 0.8 V. The internal power supply voltage DC/DC4_OUT is used, for example, for a core part of the SoC that is the controller 7. That is, the internal power supply voltage DC/DC4_OUT is supplied to a circuit block of the core part of the SoC.

As the DC/DC converters 64 of the power control circuit 6, another DC/DC converter that outputs a power supply voltage to the DRAM 4 illustrated in FIG. 1 may be included.

In addition, the control logic 61 includes one or more registers 65, for example.

Each of the registers 65 is a memory element. The memory element may store, for example, a value that specifies an operation of at least part of the configuration of the power control circuit 6. The value stored in the memory element is set or updated in response to a request issued by the controller 7, for example. This request is implemented as, for example, a command issued by the CPU 14 executing the FW 51. The registers 65 include, for example, a DC/DC mode setting register 65-1 and a sleep mode control register 65-2.

The DC/DC mode setting register 65-1 is a register for setting related to an operation mode of each of the DC/DC converters 64 (64-1, 64-2, 64-3, 64-4, . . . ). A specific example of a configuration of the DC/DC mode setting register 65-1 will be described later with reference to FIG. 3.

Each of the DC/DC converters 64 may operate in an operation mode based on a value set in the DC/DC mode setting register 65-1 while the memory system 3 is set in the normal operation mode, for example. Each of the DC/DC converters 64 includes, for example, a circuit such as a switch that operates on the basis of the value set in the DC/DC mode setting register 65-1.

The sleep mode control register 65-2 is a register for (1) setting of the power control circuit 6 related to transition to the sleep mode and exit from the sleep mode and (2) setting related to an operation mode of the LDO regulator 63 and an operation mode of the DC/DC converter 64 while the power control circuit 6 is in the sleep mode. A specific example of a configuration of the sleep mode control register 65-2 will be described later with reference to FIG. 6.

The power control circuit 6 (more specifically, the LDO regulator 63 and the DC/DC converter 64) may operate on the basis of a value set in the sleep mode control register 65-2, for example, when the memory system 3 transitions from the normal operation mode to the low power consumption mode and when the memory system 3 transitions from the low power consumption mode to the normal operation mode. Each of the LDO regulator 63 and DC/DC converter 64 includes a circuit such as a switch that operates on the basis of the value set in the sleep mode control register 65-2, for example.

The operation mode of the DC/DC converter 64 will be described below.

The operation mode of the DC/DC converter 64 is, for example, one of a pulse frequency modulation (PFM) mode, a pulse width modulation (PWM) mode, an auto mode, and an off mode. Each of the PFM and PWM modes is a voltage control scheme used by the DC/DC converter 64 to generate an output voltage.

In the PFM mode, a voltage control scheme in which the frequency is variable and the pulse width is constant is used. In the PFM mode, power consumption is small, but variations in output voltage are large.

In the PWM mode, a voltage control scheme in which the frequency is constant and the pulse width is variable is used. In the PWM mode, the power consumption is large, but variations in output voltage are small.

The auto mode is a mode in which the PFM mode and the PWM mode are automatically switched depending on a load current. In the auto mode, when the load current has exceeded a boundary while the DC/DC converter 64 is operating in the PFM mode, the PFM mode is switched to the PWM mode. Further, when the load current has become not larger than the boundary while the DC/DC converter 64 is operating in the PWM mode, the PWM mode is switched to the PFM mode. Note that the boundary has hysteresis to prevent frequent switching between the PFM mode and the PWM mode near the boundary. The hysteresis may cause, for example, the boundary to be set more greatly in a case where the PFM mode is switched to the PWM mode than in a case where the PWM mode is switched to the PFM mode.

FIG. 3 is a diagram illustrating an example of a configuration of the DC/DC mode setting register 65-1 used in the memory system 3. The DC/DC mode setting register 65-1 includes, for example, an 8-bit memory area. Hereinafter, memory areas of 8 bits of a register will be referred to as a zeroth bit memory area, a first bit memory area, . . . , and a seventh bit memory area in order from the least significant bit.

The seventh bit memory area stores a value indicative of an operation mode of the first DC/DC converter 64-1 (that is, the DC/DC channel CH1) while the memory system 3 is in the normal operation mode. When the stored value is 0, the first DC/DC converter 64-1 operates in the auto mode. When the stored value is 1, the first DC/DC converter 64-1 operates in a forced PWM mode. Unlike in the auto mode, in the forced PWM mode, automatic switching does not occur. While the forced PWM mode is set, the operation mode of the DC/DC converter 64 is fixed in the PWM mode.

The sixth bit memory area stores a value indicative of an operation mode of the second DC/DC converter 64-2 (that is, the DC/DC channel CH2) while the memory system 3 is in the normal operation mode. When the stored value is 0, the second DC/DC converter 64-2 operates in the auto mode. When the stored value is 1, the second DC/DC converter 64-2 operates in the forced PWM mode.

The fifth bit memory area stores a value indicative of an operation mode of the third DC/DC converter 64-3 (that is, the DC/DC channel CH3) while the memory system 3 is in the normal operation mode. When the stored value is 0, the third DC/DC converter 64-3 operates in the auto mode. When the stored value is 1, the third DC/DC converter 64-3 operates in the forced PWM mode.

The fourth to zeroth bit memory areas are reserved areas.

Note that the DC/DC mode setting register 65-1 may further store values indicative of operation modes of the other DC/DC converters 64.

Each of the DC/DC converters 64 may operate based on the value set in the DC/DC mode setting register 65-1 while the memory system 3 is in the normal operation mode, for example. Therefore, the setting of a value in the DC/DC mode setting register 65-1 enables setting the operation mode of each of the DC/DC converters 64 to either the auto mode or the forced PWM mode while the memory system 3 is in the normal operation mode. Note that the setting of a value in the DC/DC mode setting register 65-1 is performed, for example, on the basis of a command issued to the power control circuit 6 from the CPU 14 executing the FW 51.

Here, an operation of a memory system according to a comparative example in a case where the memory system exits from a low power consumption mode to a normal operation mode. The memory system according to the comparative example has a configuration similar to that of the memory system 3 according to the present embodiment, except for the configuration related to control of operation modes of DC/DC converters.

FIG. 4 is a time chart 8 illustrating transitions of operations and voltages in the case where the memory system according to the comparative example exits from the low power consumption mode to the normal operation mode. More specifically, the time chart 8 illustrates the transitions of an internal power supply voltage 81 supplied to a NAND flash memory, operation modes 82 of DC/DC converters, an internal power supply voltage 83 supplied to a PCIe PHY, and an operation 84 of the PCIe PHY as time passes. The horizontal axis of the time chart 8 indicates time.

In FIG. 4, time t11 is time at which the memory system is requested to exit from the low power consumption mode to the normal operation mode. At time t11, the memory system is in the low power consumption mode and the power control circuit is in the sleep mode. Thus, the operation mode 82 of each of the DC/DC converters in the power control circuit is in an off state or is in a PFM mode with low power consumption. The internal power supply voltage 81 supplied to the NAND flash memory is off, and a DC/DC converter in an on state with low voltage is set in the PFM mode. In addition, the operation 84 of the PCIe PHY is disabled.

The period from time t11 to time t12 is a period in which the memory system transitions from the low power consumption mode to the normal operation mode. Within this period, the internal power supply voltage 81 supplied to the NAND flash memory gradually rises and heightens.

Time t12 is time at which the memory system exits from the low power consumption mode to the normal operation mode. At time t12, the operation mode 82 of each DC/DC converter transitions to the auto mode. Since the load current is small at that time, the PFM mode is set based on automatic switching in the auto mode.

Then, in a period from time t12 to time t14, the operation 84 of the PCIe PHY transitions from being disabled to activation and then to initialization. The initialization includes calibration, for example. The calibration is, for example, an operation of passing a current through resistors provided in the PCIe PHY to adjust variations of chips (ICs). The load current of the PCIe PHY during the activation and initialization is small. Thus, the operation mode 82 of each DC/DC converter is maintained in the PFM mode. While the operation mode 82 is in the PFM mode, the internal power supply voltage 83 supplied to the PCIe PHY varies greatly.

Of the period from time t12 to time t14, a period from time t13 to time t14 is a period in which the internal power supply voltage 83 supplied to the PCIe PHY varies greatly. In this period, the PCIe PHY starts the initialization. For example, in the calibration, the variations in voltage need to be small because current is passed through the resistors in the PCIe PHY to adjust the variations of the chips. That is, the calibration is an operation sensitive to the variations in voltage. Since, however, the variations in the internal power supply voltage 83 are large, the PCIe PHY may perform the calibration incorrectly. Under the variations in the internal power supply voltage 83, therefore, the initialization in the PCIe PHY may fail.

Time t14 is time at which the operation 84 of the PCIe PHY transitions from the end of the initialization to the normal operation. At this time, the operation mode 82 of each DC/DC converter is maintained in the PFM mode.

Then, at time t15, the operation mode 82 of each DC/DC converter transitions to the PWM mode based on automatic switching in the auto mode. The timing when the automatic switching is triggered is, for example, the timing when a load current corresponding to any one of the DC/DC converters has exceeded a predetermined boundary.

As in the comparative example described above, the initialization of the PCIe PHY may fail because of the operation performed when the memory system exits from the low power consumption mode.

For example, at time t12 after the memory system exits from the low power consumption mode to the normal operation mode, the setting of the DC/DC mode setting register may cause the operation mode of each DC/DC converter to transition to the forced PWM mode. This transition manner enables the PCIe PHY to perform the initialization while each DC/DC converter is operating in the forced PWM mode with small variations in voltage. In this case, however, it is desirable to transition each DC/DC converter to the forced PWM mode immediately after the memory system exits from the low power consumption mode to the normal operation mode. This is because the power consumption increases in the period of transition from the low power consumption mode to the forced PWM mode. On the other hand, in the transition method of the DC/DC converter to the forced PWM mode immediately after the memory system exits from the low power consumption mode to the normal operation mode, it needs to issue a command for each DC/DC converter to set in the forced PWM mode after the memory system exits to the normal operation mode and to cause each DC/DC converter to transition to the PWM mode. The time for performing the operation of issuing the command delays timing of starting access to the NAND flash memory. If, furthermore, the DC/DC converter continues to be in the forced PWM mode thereafter, its power consumption may increase compared to a case where the DC/DC converter is set in the auto mode.

FIG. 5 is a diagram illustrating an example of a configuration of a sleep mode control register that is used in the memory system according to the comparative example. The sleep mode control register of the comparative example includes, for example, an 8-bit memory area.

The seventh bit memory area stores a value indicative of an operation of a DC/DC channel CH1 while the power control circuit is in the sleep mode.

When the stored value is 0, the DC/DC channel CH1 is turned off. That is, a first DC/DC converter is in an off mode.

When the stored value is 1, then the DC/DC channel CH1 is alive and enters into the low power mode (LPM). While the DC/DC channel CH1 is in the LPM, the first DC/DC converter is fixed to the PFM mode. In the first DC/DC converter fixed to the PFM mode, a circuit block that is used only when the first DC/DC converter is in the PWM mode is turned off. That is, the circuit block that is used only when the first DC/DC converter is in the PWM mode, is not supplied with power. Accordingly, the DC/DC channel set in the LPM can reduce power consumption.

The sixth bit memory area stores a value indicative of an operation of a DC/DC channel CH2 while the power control circuit is in the sleep mode.

When the stored value is 0, the DC/DC channel CH2 is turned off. That is, a second DC/DC converter is in the off mode.

When the stored value is 1, the DC/DC channel CH2 is alive and enters into the LPM. In this case, the second DC/DC converter is fixed to the PFM mode.

The fifth bit memory area stores a value indicative of an operation of a DC/DC channel CH3 while the power control circuit is in the sleep mode.

When the stored value is 0, the DC/DC channel CH3 is turned off. That is, a third DC/DC converter is in the off mode.

When the stored value is 1, the DC/DC channel CH3 is alive and enters into the LPM. In this case, the third DC/DC converter is fixed to the PFM mode.

The fourth bit memory area stores a value indicative of an operation of a LDO regulator while the power control circuit is in the sleep mode.

When the stored value is 0, a power supply channel from the LDO regulator is turned off. That is, the LDO regulator is in the off mode.

When the stored value is 1, the power supply channel from the LDO regulator is alive and enters into the LPM. In this case, the LDO regulator decreases the current for control.

The third bit to first bit memory areas are reserved areas.

The zeroth bit memory area stores a value related to enter and exit of the sleep mode of the power control circuit. When the stored value is 0, the power control circuit exits from the sleep mode. When the stored value is 1, the power control circuit enters into the sleep mode.

As described above, in the memory system according to the comparative example, each of the first to third DC/DC converters and LDO regulator is set to the off mode or the LPM while the power control circuit is in the sleep mode, in accordance with a setting using the sleep mode control register. This reduces power consumption in the power supply control circuit. Whether each of the first to third DC/DC converters and LDO regulator is set in the off mode or the LPM is determined based on the power state of the low power consumption mode in which the memory system is set.

In the sleep mode control register of the memory system according to the comparative example, the operation mode of each DC/DC converter is not specified when the memory system exits from the low power consumption mode to the normal operation mode (that is, when the power control circuit exits from the sleep mode). In this case, therefore, the operation mode of each DC/DC converter typically transitions to the auto mode, for example, and is set to the PFM mode based on automatic switching in the auto mode because the load current is small. In this PFM mode, for example, the initialization of the PCIe PHY may fail due to large variations in voltage.

In contrast, in the memory system 3 according to the present embodiment, when the memory system 3 has exit from the low power consumption mode to the normal operation mode, the operation mode of the DC/DC converter 64 is caused to transition to the forced PWM mode. The forced PWM mode is a PWM mode in which automatic switching is not made unlike in the auto mode. In the forced PWM mode, variations in voltage are small. Therefore, a failure of initialization in the memory system 3 (for example, in the PCIe PHY 15) can be prevented.

More specifically, by using the sleep mode control register 65-2, the operation mode of the DC/DC converter 64 is caused to transition to the forced PWM mode when the memory system 3 has exit from the low power consumption mode to the normal operation mode.

FIG. 6 is a diagram illustrating an example of a configuration of the sleep mode control register 65-2 that is used in the memory system 3. The sleep mode control register 65-2 differs from the sleep mode control register of the comparative example described above with reference to FIG. 5 in the contents regarding the zeroth bit memory area. The values stored in the seventh bit to first bit memory areas may be similar to those stored in the seventh bit to first bit memory areas of the sleep mode control register of the comparative example.

The zeroth bit memory area of the sleep mode control register 65-2 stores a value related to enter and exit of the sleep mode of the power supply control circuit 6. When the stored value is 0, the power control circuit 6 exits from the sleep mode and causes all the DC/DC channels CH1 to CH4 (that is, DC/DC converters 64-1 to 64-4) to transition to the forced PWM mode. When the stored value is 1, the power control circuit 6 enters into the sleep mode.

By using the sleep mode control register 65-2, the DC/DC converters 64-1 to 64-4 transition to the forced PWM mode when the power control circuit 6 exits from the sleep mode in response to the memory system 3 that has exit from the low power consumption mode to the normal operation mode. This enables, for example, the PCIe PHY 15 to perform the initialization while the third DC/DC converter 64-3 is operating in the forced PWM mode. In other words, the PCIe PHY 15 can perform the initialization while variations in voltage are small. Thus, a failure of the initialization in the memory system 3 can be prevented. Note that in the memory system 3, a circuit block (load) that is a target to prevent a failure of initialization is not limited to the PCIe PHY 15, but may be another circuit block that is sensitive to variations in voltage.

An example of an operation performed in a case where the memory system 3 exits from the low power consumption mode will be described specifically.

FIG. 7 is a sequence diagram illustrating an operation example in the case where the memory system 3 exits from the low power consumption mode to the normal operation mode. FIG. 7 illustrates an operation of the control logic 61, the third DC/DC converter 64-3, and the PCIe PHY 15. Note that the other DC/DC converters 64-1, 64-2 and 64-4 may operate in a similar manner to the third DC/DC converter 64-3. It is assumed that the third DC/DC converter 64-3 is set in the PFM mode while the memory system 3 is set in the low power consumption mode.

First, the control logic 61 sends the value stored in the sleep mode control register 65-2 to all the DC/DC converters 64, which includes the third DC/DC converter 64-3, in response to the memory system 3 that has exit from the low power consumption mode to the normal operation mode (A11). In the zeroth bit of the sleep mode control register 65-2, the value indicating that the power control circuit 6 exits from the sleep mode and every DC/DC channel is set in the forced PWM mode (i.e., 0) is set.

The third DC/DC converter 64-3 transitions from the PFM mode to the forced PWM mode on the basis of the value stored in the sleep mode control register 65-2 (A12). Note that the third DC/DC converter 64-3 may be set in the off mode while the memory system 3 is set in the low power consumption mode. In that case, the third DC/DC converter 64-3 transitions from the off mode to the forced PWM mode on the basis of the value stored in the sleep mode control register 65-2. Therefore, the third DC/DC converter 64-3 supplies the internal power supply voltage DC/DC3_OUT to the PCIe PHY 15 in the forced PWM mode (A13).

While the power supply voltage DC/DC3_OUT is supplied from the third DC/DC converter 64-3 in the forced PWM mode, the PCIe PHY 15 performs initialization (A14). The initialization of the PCIe PHY 15 includes, for example, calibration and a link training process. The calibration is an operation of passing a current through resistors in the PCIe PHY 15 to adjust variations among chips (ICs). The link training process is a process of making a link available, such as synchronization of clock signals between the host 2 and the memory system 3.

In addition, the control logic 61 detects that the load current of any of the one or more circuit blocks that corresponds to the one or more DC/DC converters 64, respectively, has exceeded a boundary (A15). Then, the control logic 61 instructs all the DC/DC converters 64, which includes the third DC/DC converter 64-3, to transition to the auto mode (A16).

Note that the control logic 61 may detect that the load current of the PCIe PHY 15 corresponding to the third DC/DC converter 64-3 has exceeded the boundary. In this case, the control logic 61 instructs, for example, the third DC/DC converter 64-3 to transition to the auto mode.

Then, the third DC/DC converter 64-3 transitions from the forced PWM mode to the auto mode in response to the instruction from the control logic 61 (A17). The third DC/DC converter 64-3 supplies the internal power supply voltage DC/DC3_OUT to the PCIe PHY 15 in the auto mode (A18).

In the auto mode, the operation mode of the third DC/DC converter 64-3 is automatically switched between the PFM mode and the PWM mode in accordance with the load current. Therefore, the third DC/DC converter 64-3 can supply the internal power supply voltage DC/DC3_OUT to the PCIe PHY 15 in either the PFM mode or the PWM mode which is selected in accordance with the load current.

As described above, the PCIe PHY 15 performs the initialization while the internal power supply voltage DC/DC3_OUT is supplied from the third DC/DC converter 64-3 in the forced PWM mode. That is, the PCIe PHY 15 performs the initialization while variations in voltage are small. This can prevent a failure of the initialization in the memory system 3.

The DC/DC converter 64 also transitions from the forced PWM mode to the auto mode in response to the load current that has exceeded the boundary. This also prevents the DC/DC converter 64 from being fixed in a high power consumption state (i.e. from being maintained in the forced PWM mode).

Note that the registers 65 provided in the control logic 61 may further include a channel designation register 65-3. The channel designation register 65-3 designates a DC/DC channel (i.e., a DC/DC converter 64) to be transitioned to the forced PWM mode in response to the power control circuit 6 that has exit from the sleep mode. Specifically, the channel designation register 65-3 includes a plurality of memory areas, for example. Each of the memory areas stores information indicative of a DC/DC channel to be transitioned to the forced PWM mode in response to the power control circuit 6 that has exit from the sleep mode.

In this case, in A11, the control logic 61 may send the value stored in the sleep mode control register 65-2 and the information stored in the channel designation register 65-3 to the DC/DC converters 64 in response to the memory system 3 that has exit from the low power consumption mode to the normal operation mode. The zeroth bit of the sleep mode control register 65-2 stores, for example, a value indicating that the power control circuit 6 exits from the sleep mode and causes the designated DC/DC channel to transition to the forced PWM mode (i.e., 0). In addition, the channel designation register 65-3 stores information that designates a DC/DC channel to be transitioned to the forced PWM mode.

In this case, in A12, the DC/DC converter 64 corresponding to the designated DC/DC channel, which is based on the value stored in the channel designation register 65-3, transitions from the PFM mode (or off mode) to the forced PWM mode. Note that the DC/DC converter 64 corresponding to an undesignated DC/DC channel transitions from the PFM mode (or off mode) to the auto mode, based on the value stored in the DC/DC mode setting register 65-1, for example. In addition, the DC/DC converter 64 that has transitioned to the forced PWM mode transitions to the auto mode in A17 in response to the load current that has exceeded the boundary.

In a case where the channel designation register 65-3 is further used as described above, only a specific DC/DC converter 64 can be caused to transition to the forced PWM mode when the memory system 3 has exit from the low power consumption mode to the normal operation mode. In addition, the specific DC/DC converter 64 that has transitioned to the forced PWM mode can be caused to transition to the auto mode in response to the load current that has exceeded the boundary.

FIG. 8 is a time chart 9 illustrating an example of transitions of operations, voltages, and a current in the case where the memory system 3 exits from the low power consumption mode to the normal operation mode. Specifically, the time chart 9 represents the transitions of an internal power supply voltage 91 (i.e., DC/DC1_OUT) supplied to the NAND flash memory 5, an operation mode 92 of each DC/DC converter 64, an internal power supply voltage 93 (i.e., DC/DC3_OUT) supplied to the PCIe PHY 15, an operation 94 of the PCIe PHY 15, and a load current 95 of the PCIe PHY 15 as time passes. The horizontal axis of the time chart 9 indicates time.

A boundary 95A is a value of a current for determination to switch between the PFM mode and the PWM mode while each DC/DC converter 64 is in the auto mode. More specifically, when the load current 95 has exceeded the boundary 95A, each DC/DC converter 64 in the auto mode is switched from the PFM mode to the PWM mode. When the load current 95 has become not larger than the boundary 95A, each DC/DC converter 64 in the auto mode is switched from the PWM mode to the PFM mode. The boundary 95A is also used for determination to switch each DC/DC converter 64 from the forced PWM mode to the auto mode.

Time t21 is time at which the memory system 3 is requested to exit from the low power consumption mode to the normal operation mode. At time t21, the memory system 3 is in the low power consumption mode and the power control circuit 6 is in the sleep mode. Thus, the operation mode 92 of each DC/DC converter 64 in the power control circuit 6 is the off mode or the PFM mode with low power consumption. The internal power supply voltage 81 supplied to the NAND flash memory 5 is off, and the DC/DC converter 64 in an on state with low voltage is set in the PFM mode. The operation 94 of the PCIe PHY is disabled. The load current 95 is low.

The period from time t21 to time t22 is a period in which the memory system 3 transitions from the low power consumption mode to the normal operation mode. Within this period, the internal power supply voltage 91 supplied to the NAND flash memory 5 gradually rises and heightens.

Time t22 is time at which the memory system 3 has exit from the low power consumption mode to the normal operation mode. At time t22, the operation mode 92 of each DC/DC converter 64 transitions to the forced PWM mode.

In a period from time t22 to time t23, the operation 94 of the PCIe PHY transitions from being disabled to activation. The load current 95 of the PCIe PHY 15 is smaller than the boundary 95A during the activation, but the variations in the internal power supply voltage 93 supplied to the PCIe PHY 15 are small because the DC/DC converter 64 is in the forced PWM mode.

Time t23 is time at which the operation 94 of the PCIe PHY transitions from the activation to initialization (for example, calibration).

In a period from time t23 to time t24, the PCIe PHY 15 starts to perform the initialization. The load current 95 of the PCIe PHY 15 is smaller than the boundary 95A during the initialization, but the variations in the internal power supply voltage 93 supplied to the PCIe PHY 15 are small while the DC/DC converter 64 is in the forced PWM mode. The small variations in the internal power supply voltage 93 prevent a failure of the initialization in the PCIe PHY 15. For example, in the PCIe PHY 15, the risk that incorrect calibration is performed is reduced.

Time t24 is time at which the operation 94 of the PCIe PHY transitions from the end of the initialization to the normal operation. At this time, the operation mode 92 of each DC/DC converter 64 is maintained in the forced PWM mode. After the operation 94 of the PCIe PHY transitions to the normal operation, the load current 95 of the PCIe PHY 15 may increase.

Then, at time t25, the operation mode 92 of each DC/DC converter 64 transitions from the forced PWM mode to the auto mode on the basis of, for example, an instruction from the control logic 61 in response to the load current 95 of the PCIe PHY 15 that has exceeded the boundary 95A. The timing of transition to the auto mode is instructed by the control logic 61, based on the load current 95. It is therefore unnecessary for a configuration outside the power control circuit 6, such as the CPU 14 executing the FW 51, to control the operation mode 92 of each DC/DC converter 64. Note that the configuration outside the power supply control circuit 6 may perform control so that the operation mode 92 of each DC/DC converter 64 transitions from the forced PWM mode to the auto mode at a certain timing.

The foregoing example describes that the operation mode 92 of each DC/DC converter 64 transitions to the auto mode in response to the load current 95 of the PCIe PHY 15 that has exceeded the boundary 95A. However, the operation mode 92 of each DC/DC converter 64 may transition to the auto mode in response to the load current corresponding to any one of the DC/DC converters 64 that has exceeded the boundary. Alternatively, the operation mode 92 of each DC/DC converter 64 may transition to the auto mode when the load current corresponding to any one of the DC/DC converters 64 that are set in the forced PWM mode has exceeded the boundary.

After that, the operation mode 92 of each DC/DC converter 64 is set to either the PFM mode or the PWM mode according to automatic switching in the auto mode. This can prevent the DC/DC converters 64 from being fixed in a high power consumption state (i.e., from being kept in the PWM mode).

As described above, the present embodiment can prevent a failure of initialization due to variations in supply voltage. The DC/DC converter 64 transitions to the forced PWM mode in response to the memory system 3 that has transitioned from the low power consumption mode to the normal operation mode.

For example, the third DC/DC converter 64-3 supplies the internal power supply voltage DC/DC3_OUT to the PCIe PHY 15. The PCIe PHY 15 performs initialization while the third DC/DC converter 64-3 is in the forced PWM mode. In the forced PWM mode, the variations in voltage are small. Thus, the possibility of failure of the initialization in the PCIe PHY 15 can be decreased more than that in a case where the initialization is performed while the third DC/DC converter 64-3 is in the PFM mode (that is, in a mode in which variations in voltage are large).

Each of the various functions described in the embodiment may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiment may be realized in a processing circuit.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system connectable to a host, comprising:
a nonvolatile memory;
a controller configured to control the nonvolatile memory; and
a power control circuit that controls power to be supplied to the controller and the nonvolatile memory and includes one or more DC/DC converters, wherein
the nonvolatile memory and the controller include one or more circuit blocks;
each of the one or more DC/DC converters supplies an internal power supply voltage to one of the one or more circuit blocks; and
a first DC/DC converter of the one or more DC/DC converters transitions to a forced pulse width modulation mode in response to the memory system that has transitioned from a low power consumption mode to a normal operation mode.

2. The memory system according to claim 1, wherein
while operating in the forced pulse width modulation mode, the first DC/DC converter transitions from the forced pulse width modulation mode to an auto mode when a load current of any of the one or more circuit blocks has exceeded a boundary, and in the auto mode, a pulse width modulation mode and a pulse frequency modulation mode are switched based on the load current.

3. The memory system according to claim 1, wherein
the one or more circuit blocks include a first circuit block to which the first DC/DC converter supplies the internal power supply voltage, and
while operating in the forced pulse width modulation mode, the first DC/DC converter transitions from the forced pulse width modulation mode to an auto mode when a load current of the first circuit block has exceeded a boundary, and in the auto mode, a pulse width modulation mode and a pulse frequency modulation mode are switched based on the load current.

4. The memory system according to claim 3, wherein
the first circuit block performs an initialization operation while the first DC/DC converter operates in the forced pulse width modulation mode.

5. The memory system of claim 4, wherein
the first circuit block includes a circuit that is connected to the host via a serial interface.

6. The memory system of claim 5, wherein
the serial interface conforms to a PCI Express standard.

7. The memory system of claim 1, wherein
the power control circuit includes a first register,
the first register stores a first value indicative of transitioning to the forced pulse width modulation mode in response to the memory system that has transitioned from the low power consumption mode to the normal operation mode, and
based on the first value, the first DC/DC converter transitions to the forced pulse width modulation mode in response to the memory system that has transitioned from the low power consumption mode to the normal operation mode.

8. The memory system of claim 1, wherein
the power control circuit includes a second register,
the second register stores information that designates at least one of the one or more DC/DC converters, and
when the information includes information that designates the first DC/DC converter, the first DC/DC converter transitions to the forced pulse width modulation mode in response to the memory system that has transitioned from the low power consumption mode to the normal operation mode.

9. The memory system of claim 1, wherein
each of the one or more DC/DC converters transitions to the forced pulse width modulation mode in response to the memory system that has transitioned from the low power consumption mode to the normal operation mode.

10. The memory system of claim 9, wherein
while operating in the forced pulse width modulation mode, each of the one or more DC/DC converters transitions from the forced pulse width modulation mode to an auto mode when a load current of any of the one or more circuit blocks exceeds a boundary, and in the auto mode, a pulse width modulation mode and a pulse frequency modulation mode are switched based on the load current.

11. A power control circuit that controls power to be supplied to a memory system connectable to a host, the power control circuit comprising
one or more DC/DC converters each of which supplies an internal power supply voltage to one of one or more circuit blocks that are included in a controller and a nonvolatile memory, the memory system comprising the controller and the nonvolatile memory, wherein
a first DC/DC converter of the DC/DC converters transitions to a forced pulse width modulation mode in response to the memory system that has transitioned from a low power consumption mode to a normal operation mode.

12. The power control circuit of claim 11, wherein
while operating in the forced pulse width modulation mode, the first DC/DC converter transitions from the forced pulse width modulation mode to an auto mode when a load current of any of the one or more circuit blocks has exceeded a boundary, and in the auto mode, a pulse width modulation mode and a pulse frequency modulation mode are switched based on the load current.

13. The power control circuit of claim 11, wherein
the one or more circuit blocks include a first circuit block to which the first DC/DC converter supplies the internal power supply voltage, and
while operating in the forced pulse width modulation mode, the first DC/DC converter transitions from the forced pulse width modulation mode to an auto mode when a load current of the first circuit block has exceeded a boundary, and in the auto mode, a pulse width modulation mode and a pulse frequency modulation mode are switched based on the load current.

14. The power control circuit of claim 13, wherein
the first circuit block performs an initialization operation while the first DC/DC converter operates in the forced pulse width modulation mode.

15. The power control circuit of claim 14, wherein
the first circuit block includes a circuit that is connected to the host via a serial interface.

16. The power control circuit of claim 15, wherein
the serial interface conforms to a PCI Express standard.

17. The power control circuit of claim 11, further comprising
a first register that stores a first value indicative of transitioning to the forced pulse width modulation mode in response to the memory system that has transitioned from the low power consumption mode to the normal operation mode, wherein
based on the first value, the first DC/DC converter transitions to the forced pulse width modulation mode in response to the memory system that has transitioned from the low power consumption mode to the normal operation mode.

18. The power control circuit of claim 11, further comprising
a second register that stores information that designates at least one of the one or more DC/DC converters, wherein
when the information includes information that designates the first DC/DC converter, the first DC/DC converter transitions to the forced pulse width modulation mode in response to the memory system that has transitioned from the low power consumption mode to the normal operation mode.

19. The power control circuit of claim 11, wherein
each of the one or more DC/DC converters transitions to the forced pulse width modulation mode in response to the memory system that has transitioned from the low power consumption mode to the normal operation mode.

20. The power control circuit of claim 19, wherein
while operating in the forced pulse width modulation mode, each of the one or more DC/DC converter transitions from the forced pulse width modulation mode to an auto mode when a load current of any of the one or more circuit blocks has exceeded a boundary, and in the auto mode, a pulse width modulation mode and a pulse frequency modulation mode are switched based on the load current.

* * * * *